United States Patent [19]

Coppola et al.

[11] 4,040,600

[45] Aug. 9, 1977

[54] SHUT-OFF VALVE

[75] Inventors: Patrick S. Coppola, Schenectady; Stephen Kotansky, Watervliet, both of N.Y.

[73] Assignee: General Electric Company, Schenectady, N.Y.

[21] Appl. No.: 649,427

[22] Filed: Jan. 15, 1976

[51] Int. Cl.² .......................................... F16K 31/122
[52] U.S. Cl. ...................................... 251/63; 251/333; 251/63.5
[58] Field of Search ................... 251/25, 63.5, 63, 333

[56] References Cited

U.S. PATENT DOCUMENTS

| 3,070,116 | 12/1962 | Noland et al. | 251/333 X |
| 3,232,313 | 2/1966 | Bering | 251/333 X |
| 3,495,501 | 2/1970 | Kere-Jensen | 91/440 |

FOREIGN PATENT DOCUMENTS

| 65,291 | 10/1955 | France | 251/63.5 |
| 480,965 | 5/1953 | Italy | 251/63.5 |
| 1,009,729 | 11/1965 | United Kingdom | |
| 1,155,146 | 6/1969 | United Kingdom | |
| 1,186,002 | 4/1970 | United Kingdom | |

Primary Examiner—Arnold Rosenthal
Attorney, Agent, or Firm—James W. Mitchell; John F. Ahern

[57] ABSTRACT

A shut-off valve may control the flow of high-pressure fluid in an on or off manner. The valve includes a valve housing having an axial bore therethrough with a valve member slidable therein. The valve member is formed with a hemispherical poppet which, in one position, is seated between a valve inlet port and a valve outlet port. The valve member is floatably mounted within the axial bore so as to render the hemispherical poppet self-aligning with respect to the valve seat. The valve is remotely actuated by a valve actuating fluid.

6 Claims, 1 Drawing Figure

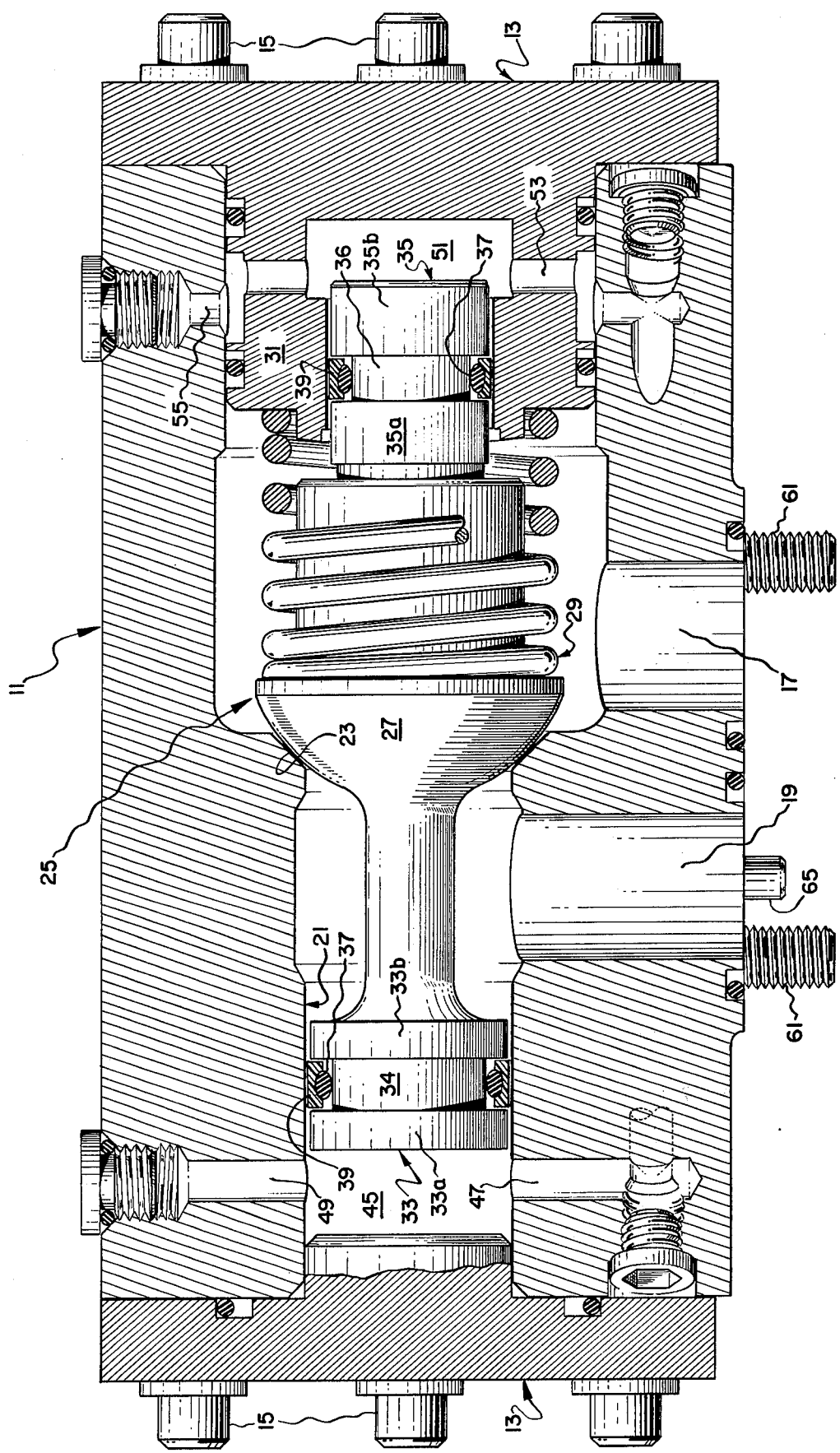

SHUT-OFF VALVE

BACKGROUND OF THE INVENTION

This invention relates, in general, to remotely controlled valves of the type which may be employed in hydraulic control systems and, in particular, this invention relates to a shut-off valve used to control high-pressure hydraulic fluid.

A shut-off valve may be employed in a hydraulic control system for selectively blocking the flow of hydraulic fluid through the system in one mode of operation and for passing the flow of hydraulic fluid in a second mode of operation. Hence, the shut-off valve is basically a hydraulic on-off switch. For example, in combination with a large steam turbine, a steam inlet valve controls the steam inflow into the turbine. The steam inlet valve may be hydraulically positioned against a valve closing spring by means of a hydraulic cylinder which receives an input of hydraulic fluid from a hydraulic manifold which includes a servo-valve which controls the flow of hydraulic fluid to the cylinder. The input flow to the hydraulic manifold is controlled by a shut-off valve. If the shut-off valve fails in an open position, the hydraulic fluid would be uselessly pumped to drain. If the shut-off valve fails in a closed position, the steam inlet valve cannot be hydraulically controlled. This foregoing example is illustrated in U.S. Pat. No. 3,495,501 to Kure-Jensen issued Feb. 17, 1970. In that patent, a shut-off valve 5 controls the inflow of pressurized fluid to servo-valve 6 which, in turn, controls the fluid supply for positioning a steam valve 1. The shut-off valve, itself, is hydraulically and remotely positioned by a trip valve 13.

Prior art valves used in the aforementioned environment have been known to malfunction due to jamming, rusting, plugging and leaking. In the prior art, a spool type of valve has been employed wherein jamming could occur if contaminates become wedged between the spool and the housing bore. One source of contamination could be rusting especially when water and moisture has found its way into the pressurized hydraulic fluid. Leakage is objectionable in a shut-off valve for obvious reasons and also because it requires an increased pump capacity to maintain the desired hydraulic pressure and hence presents an increase in turbine losses and a decrease in turbine efficiency. Rusting can also cause plugging of hydraulic lines by dispersing rust contaminates throughout the hydraulic system.

The present invention improves the prior art shut-off valves in the following manner. A valve housing includes an inlet port and an outlt port with a valve seat therebetween. The valve seat is part of an axial bore formed through the valve housing. A valve member is slidable within the axial bore and includes a hemispherical poppet which is self-aligning with respect to the valve seat. The valve member also includes a spool at each end which defines a diametrical clearance between the spool circumference and the bore circumference. Each spool also includes a slide means which bears against the interior of the axial bore so that the valve member floats within the axial bore, and the slide means in combination with the spool clearance can wipe contaminates from the bore surface. The foregoing arrangement increases the efficiency of the hemispherical poppet and seat seal, while also obviating any tendency of the valve member to jam or stick. Moreover, because of the inherent simplicity of construction the valve may be formed from a stainless steel material to obviate rusting without any additional internal sleeving and surface treatments.

It is therefore one object of the present invention to provide an improved shut-off valve wherein the potential for jamming is greatly reduced.

It is another object of the present invention to provide a shut-off valve wherein the sealing arrangement between the inlet and outlet ports is improved.

These and other objects and advantages of the present invention will become apparent from the following detailed description of the invention when taken in connection with the appended drawing.

BRIEF DESCRIPTION OF THE DRAWING

The drawing is an elevation view in partial cross section of a shut-off valve according to the present invention.

DETAILED DESCRIPTION OF THE INVENTION

The drawing shows a valve housing 11 which includes an end cap 13 removably fastened at each end of the valve housing by means of bolts 15. The valve housing is formed with an inlet port 17 and an outlet port 19 for passing hydraulic fluid through the valve housing. An axial bore 21 extends through the interior of the valve housing and a portion of the axial bore defines a valve seat 23 between the inlet port and the outlet port.

A valve member 25 is slidable within the axial bore and includes a hemispherical poppet 27. The valve seat 23 has a relatively flat tapered surface whereas the hemispherial poppet 27 has a relatively round surface and hence contact between the poppet and valve seat approximates a point, when viewed in cross section, rather than an overlap metal-to-metal contact prevalent in a spool-type valve. This construction eliminates one source of valve jamming which is present in the prior art spool-type valve. Moreover, the surface of hemispherical poppet is hardened in comparison to the valve seat thus providing an improved seal by virtue of a slight metallic deformation of the valve seat when the poppet is seated. This advantage is not present in a sliding fit of a spool-type valve. The hemispherical poppet is biased in a valve close direction by means of a coil spring 29 having one end seated on the hemispherical poppet and an opposite end seated on a valve stop 31 formed on one end cap 13. The spring is sized to give memory to the hemispherical poppet so that it will remain seated in a valve closed position until valve actuating fluid is applied to unseat the hemispherical poppet. The spring 29 also provides some incidental closing force when the valve actuating fluid is being exhausted.

The valve member is formed, at its piston end, with a first spool 33. A second spool 35 is formed at the opposite or rod end of the valve member. The first spool 33 includes annular lands 33a and 33b axially separated by an annular groove 34. The second spool 35 includes annular lands 35a and 35b axially separated by an annular groove 36. An "O" ring 37 is inserted into each groove. Further each spool includes a slide means 39 inserted into the annular groove and disposed about the "O" ring. The slide means extends radially beyond the outer surface of its respective spool and contacts the surface of bore 21. The slide means may be a channel member formed from a material such as polytetrafluoroethylene. A diametrical clearance is provided between each land and the housing bore which is on the order of 0.003 to 0.006 inch in an approximately one-inch diameter bore. This clearance is significant in that it allows the valve member to float within the axial bore such that the hemispherical poppet becomes self-aligning with respect to the valve seat. The sliding means 39 minimizes valve member sticking or jamming while also wiping the surface of the axial bore. Moreover, should any contaminates be present within the hydraulic fluid, the diametrical clearance is such that contaminates would not cause valve sticking. Another feature of the valve is that the valve seat 23 is integrally formed within the axial bore which prevents it from being swept away by high-pressure hydraulic fluid.

The valve member is opened against the force of spring 29 and hydraulic pressure in the inlet port 17 by means of valve actuating fluid input into pressure chamber 45 through inlet line 47. Inlet line 47 may be further extended (not shown) to a port as, for example, is shown in U.S. Pat. No. 3,495,501 to Kure-Jensen issued Feb. 17, 1970 at numeral 23. Port 49, shown plugged, can be used for a pressure test. When it is desired to close the valve member hemispherical poppet, fluid pressure to pressure chamber 45 is cut off and the force of the fluid pressure from inlet port 17 closes the valve.

A drain is provided adjacent the rod end of the valve member comprising drain chamber 51 and drain line 53. A test port 55 (shown plugged) is also provided to the drain chamber.

Bolt ends 61 are shown for mounting the valve to a manifold and an index pin 65 is provided to prevent an inadvertent reverse mounting of the shut-off valve to a manifold (not shown).

In operation, the shut-off valve has two positions. It may block fluid flow from the inlet port to the outlet port when pressurized fluid is not present in pressure chamber 45 so that hemispherical poppet 27 is seated on valve seat 23. In a steam turbine, such a position would occur during a turbine trip. During a normal operating condition, valve member 25 is opened by the application of pressurized fluid in chamber 45.

While there has been shown what is considered to be the preferred embodiment of the present invention, other modifications may occur to those skilled in the art; and, it is intended to cover in the appended claims all such modifications as fall within the true spirit and scope of the invention.

What is claimed is:

1. A fluid actuated, remotely controlled shut-off valve comprising:
   a valve housing including an inlet port and an outlet port whereby a controlled fluid is passed through the valve housing;
   an axial bore formed within the valve housing, the bore including a valve seat between the inlet port and the outlet port;
   a valve member slidable within the axial bore, the valve member being formed with a hemispherical poppet; the valve member having first and second positions whereby in the first position the hemispherical poppet is seated on the valve seat closing the outlet port to the inlet port, and in the second position the hemispherical poppet is unseated for opening the outlet port to the inlet port;
   a first spool formed at one end of the valve member in fluid communication with a valve actuating fluid supply;
   a second spool formed at the other end of the valve member in fluid communication with a drain; and, wherein each spool comprises:
   i. at least two annular lands spaced apart in the axial direction having at least one annular groove formed therebetween;
   ii. an "O" ring disposed within each annular groove; and,
   iii. slide means comprising an annular channel member disposed about each "O" ring and extending beyond the circumference of said spool in contact with said axial bore.

2. The valve recited in claim 1 wherein the slide means is comprised of polytetrafluorethylene.

3. The valve recited in claim 1 wherein the valve further includes means biasing the hemispherical poppet into a valve closed position.

4. A valve for the remote control of a pressurized fluid comprising:
   a valve housing having an inlet port and an outlet port whereby the pressurized fluid is passed through the valve housing;
   an axial bore within the valve housing, the bore being formed with a valve seat between the inlet port and the outlet port;
   a valve member slidable within the axial bore, the valve member being formed with a hemispherical poppet; the valve member having first and second positions whereby in the first position the hemispherical poppet is seated on the valve seat closing the outlet port to the inlet port; and, in the second position the hemispherical poppet is unseated opening the outlet port to the inlet port;
   a spool at each opposite end of the valve member, each spool including a slide means extending beyond the circumference of the spool for floating the valve member within the axial bore; each spool further comprising at least two annular lands spaced apart in the axial direction having at least one annular groove formed therebetween; sealing means including at least one "O" ring disposed in each annular groove; said slide means being an annular ring disposed about said "O" ring and contacting the inner surface of said axial bore; and, a diametrical clearance formed between each land and the inner surface of said bore; and,
   an actuating fluid input at one end of the valve adjacent one spool for positioning the valve member.

5. The valve recited in claim 4 wherein the valve further includes means biasing the hemispherical poppet into a valve closed position.

6. The valve recited in claim 4 wherein the valve member is a one-piece construction comprising the hemispherical poppet and the two end spools.

* * * * *